Donald G. Lyon
INVENTOR.

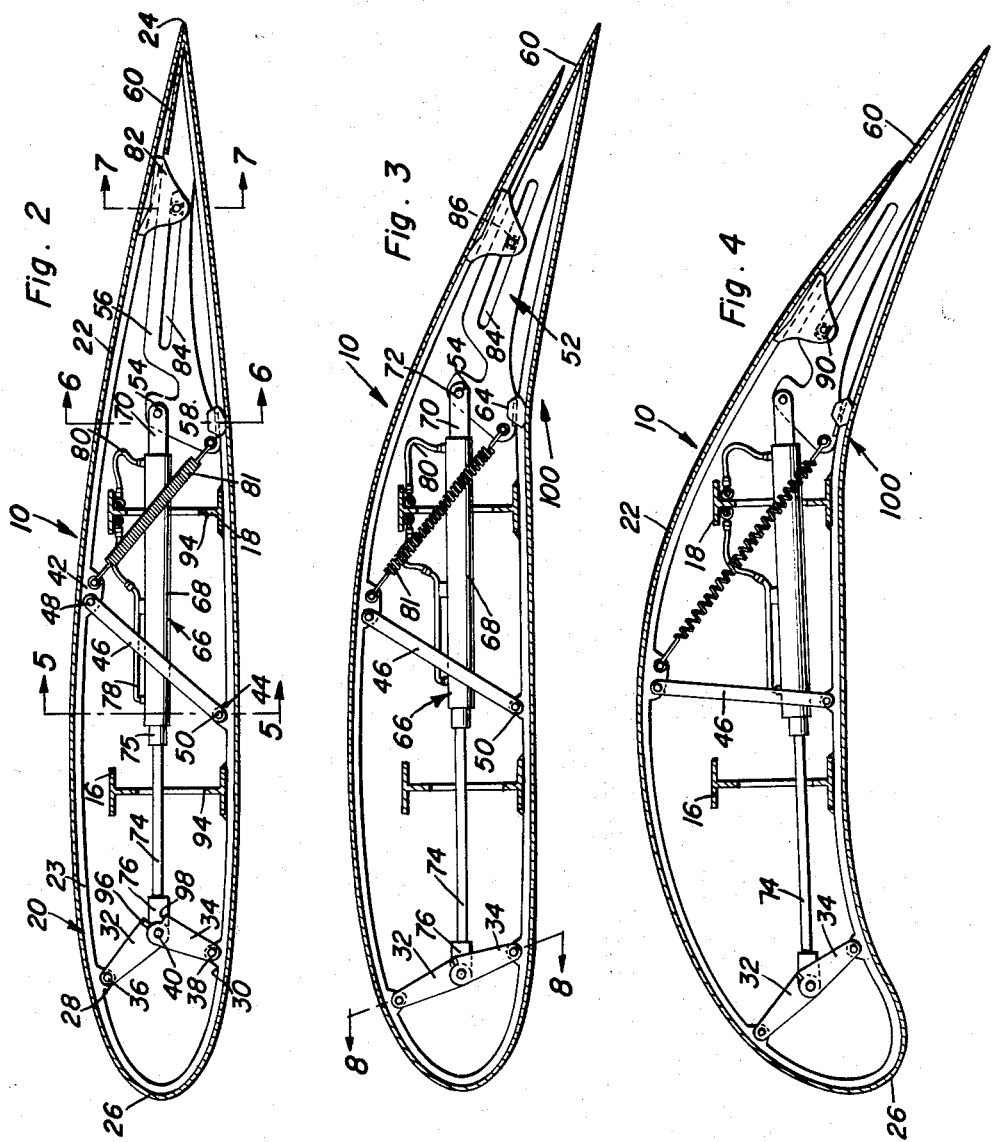

April 20, 1965    D. G. LYON    3,179,357
VARIABLE SHAPED AIRFOIL
Filed Feb. 27, 1962    6 Sheets-Sheet 3
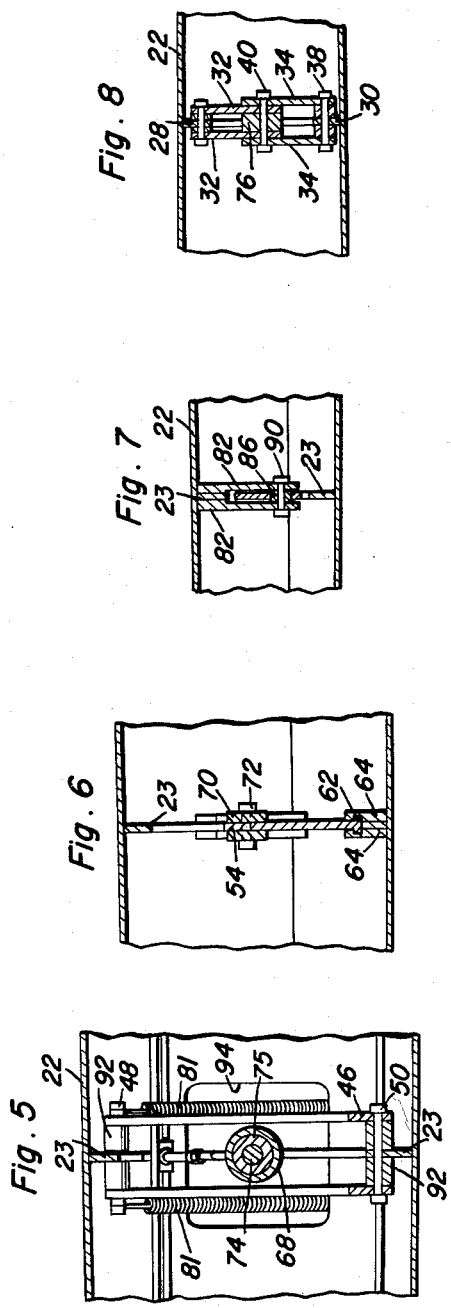
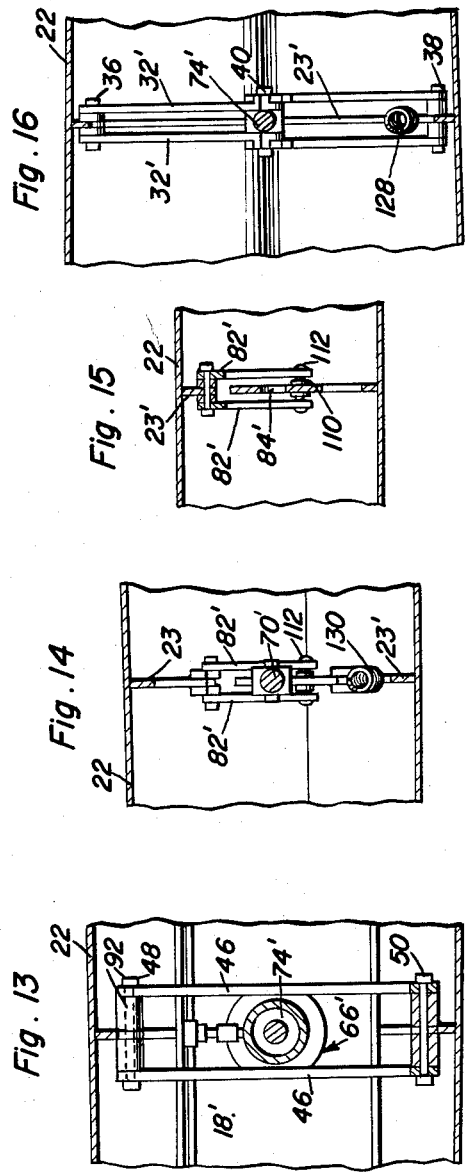
Donald G. Lyon
INVENTOR.

April 20, 1965 D. G. LYON 3,179,357
VARIABLE SHAPED AIRFOIL
Filed Feb. 27, 1962 6 Sheets-Sheet 4
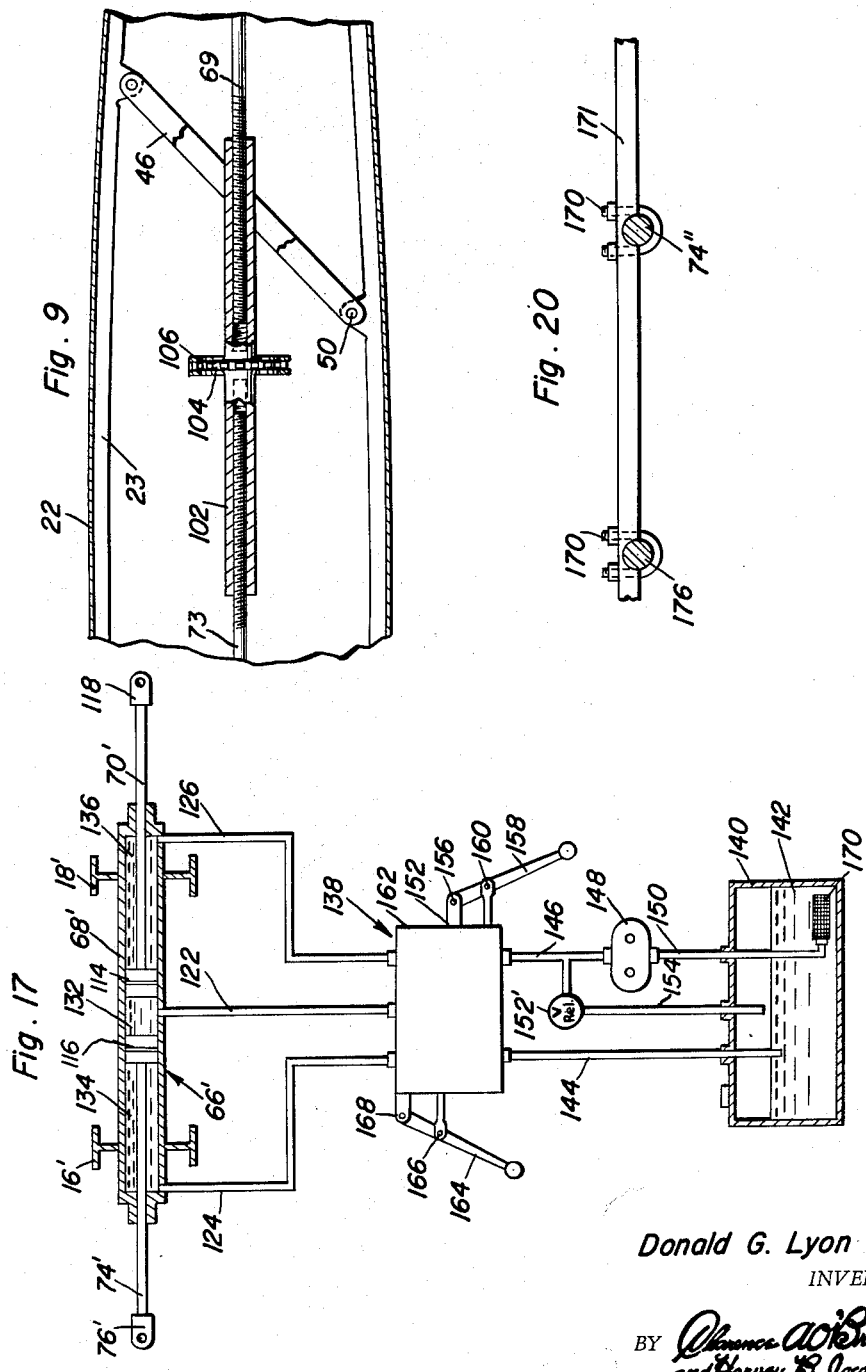
Donald G. Lyon
INVENTOR.

April 20, 1965
D. G. LYON
3,179,357
VARIABLE SHAPED AIRFOIL
Filed Feb. 27, 1962
6 Sheets-Sheet 5
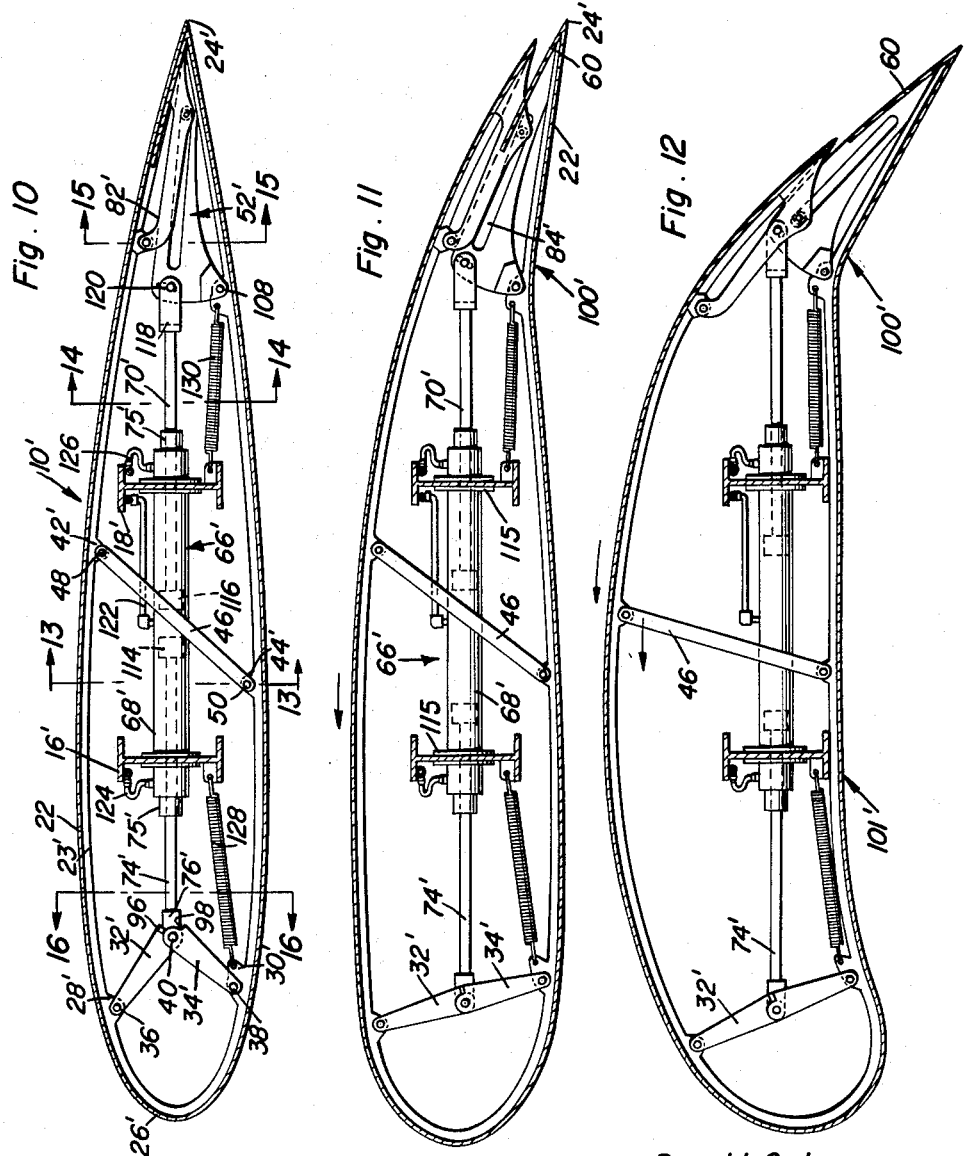
Donald G. Lyon
INVENTOR.

April 20, 1965  D. G. LYON  3,179,357
VARIABLE SHAPED AIRFOIL
Filed Feb. 27, 1962  6 Sheets-Sheet 6
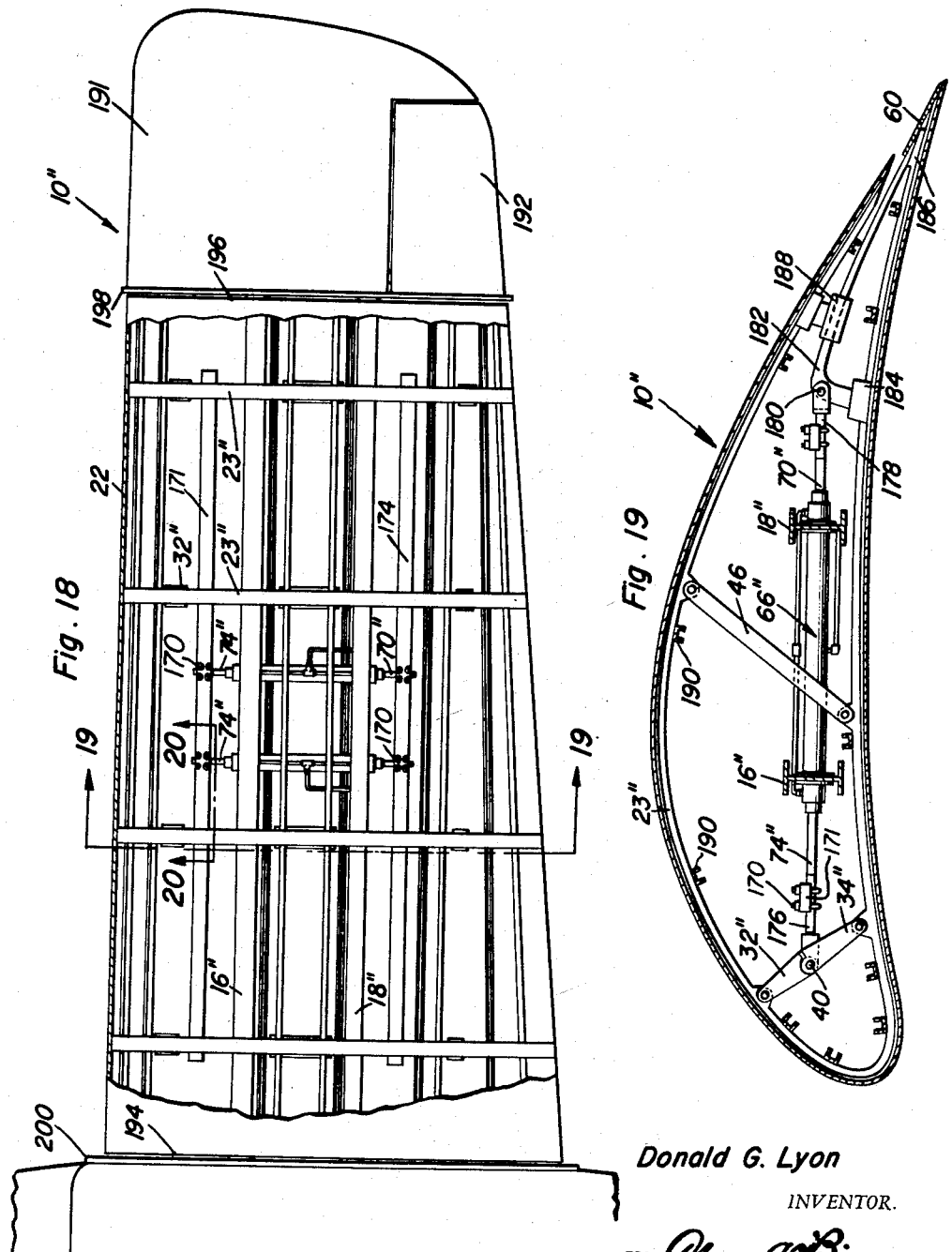
Donald G. Lyon
INVENTOR.

United States Patent Office 3,179,357
Patented Apr. 20, 1965

3,179,357
VARIABLE SHAPED AIRFOIL
Donald G. Lyon, Dubuque, Iowa
(1007 8th St., Alexandria, Va.)
Filed Feb. 27, 1962, Ser. No. 175,917
5 Claims. (Cl. 244—44)

This invention relates to airfoil structures, and more particularly to an airfoil structure adapted to be used as a wing on an aircraft which is deformable into shapes regulatable by the pilot or other personnel in the aircraft.

This invention is an improvement upon and a continuation-in-part of my copending application Serial No. 63,509, filed October 19, 1960, now Patent No. 3,076,-623.

It is a primary object of the invention to provide an improved flexible aircraft wing structure and means to vary the airfoil cross-sectional shape of the wing structure by remote control means.

It is yet another object of the invention to provide an airfoil structure which may give or flex when subjected to heavy stresses or shocks resulting from abrupt changes in ambient atmospheric conditions such as when the airfoil is moving through highly turbulent air.

It is another object of the invention to provide a hydraulic power device for controlling the contour or cross-sectional shape of a wing and wherein the hydraulic system may serve the secondary function of a shock or vibration dampener to regulate the response of the wing contour to changes in aerodynamic forces produced by changes in ambient atmospheric conditions.

It is yet another object of the invention to provide a simple and reliable means for changing the shape of an aircraft airfoil while in flight and thereby providing improved maneuverability and flying characteristics by relatively rapid accommodation to aerodynamic changes in ambient conditions.

My invention provides means whereby an airfoil may be changed from a shape having low lifts and low drag qualities to another shape having high lift qualities. When this is done, there is a corresponding shift of the center of lift of the airfoil toward the leading edge thereof. The center of lift shifts forwardly when the thickness or camber of the airfoil is increased. As the center of lift shifts forwardly, it increases the length of the moment arm between it and the tail surfaces and thereby provides better leverage for the controls in the empennage section of the aircraft during slow airspeeds such as when landing or taking off. Thus, an increase in control surface response occurs naturally as a consequence of a change in ambient conditions at critical moments in the flight of the aircraft when it is flying at a slow speed as an improved safety measure.

Still another object of the invention is to provide means whereby an aircraft may carry and take off with a heavier load and operate at a higher speed without any increase in fuel consumption and without any increase in cost. The crew of the aircraft which is equipped with this invention, can shape the wings of the aircraft in cooperation with atmospheric conditions for maximum lift at take-off and landing, and for cruising at high speed flight they can reduce the thickness of the wings to reduce the drag thereon and thereby increase the operating speed of the aircraft without any increase of fuel consumption. Therefore, any aircraft equipped with this invention can transport a given heavy load from one airfield to another in less time and with greater safety and more economically than can the same aircraft under identical conditions equipped with a fixed shaped airfoil.

It is still another object of the invention to provide a flexible airfoil surface for aircraft which may be flexed or deformed while in flight for cracking and breaking loose formations of ice and snow forming thereon.

It is still another object of the invention to provide an aircraft wing having rigid spars fixed to the fuselage of the aircraft and extending through a wing structure which is floatingly mounted on the spars and power-controlled whereby any personnel of the aircraft may by remote control means shift the wings forwardly or rearwardly in relation to the fixed spars for changing the location of the center of pressure or center of lift of the wings. This permits the crew of the aircraft to change the center of lift of the wings as the center of gravity of the aircraft changes in flight or is changed due to different loading thereof. This permits smaller control surfaces to be used, thereby reducing the drag of the aircraft in permitting it to fly at a higher cruising speed.

It is still another object of my invention to provide a flexible airfoil having improved means at the trailing edge thereof for flexing the trailing edge to different shapes.

It is still another object of my invention to provide a variable shaped airfoil that maintains a clean or smooth and streamlined configuration and a very favorable lift-drag ratio regardless of the shape to which it is changed. My variable shaped airfoil is so designed that it produces a continuous change in shape over its entire structure when operated.

The current rigid construction of the wings of modern aircraft are necessarily a compromise between different optimum contours and hence suffer at two areas of severe deficiency, namely, high resistance or drag in high speed flight, and dangerous stall characteristics in slow speed flight. This type of wing can fly efficiently in the air only through a small range of airspeeds. But the desired goal in an airplane is that it should fly efficiently in both high and slow airspeeds. A conflict therefore exists, and the aircraft industry has attempted to overcome the unsatisfactory compromise by use of devices such as flaps, slots, slits, fences, spoilers, and boundary layer control devices. These compromises have not been successful either in series or in parallel construction. The best top speed over landing speed ratios achieved by use of the aforementioned devices is about four to one while the theoretical possibility is in excess of ten to one. The mechanical efficiency of these devices is also very low and requires excessive power in order to show a measurable result. After extended experimentation it is safe to conclude that there is no chance whatsoever of these devices ever achieving the mechanical efficiency necessary to sustain an airplane over a wide range of airspeeds. A more complete solution to the problem lies in the sucessful development of a wing that may change its thickness and camber to meet the varying needs of an aircraft in flight pursuant to the present invention.

The variable shaped airfoil described and illustrated herein endows airplanes with characteristics similar to what nature has given to birds—an airfoil that readily adapts to the varying conditions of flight. It provides for airplanes in flight the efficiency of control demonstrated by birds. With respect to the aircraft, the airfoil must also possess mechanism and design features that will permit it to operate with a very high degree of reliability and safety. The variable shaped airfoil of the present invention meets these requirements as will become evidently clear in the following detailed disclosure.

These together with other objects and advtanges which will become subsequently apparent reside in the details of construction and operation as more fully hereinafter described and claimed, reference being had to the accompanying drawings forming a part hereof, wherein like numerals refer to like parts throughout, and in which:

FIGURE 2 is an enlarged vertical cross-sectional view taken substantially on the plane of line 2—2 in FIGURE 1;

FIGURES 3 and 4 are cross-sectional views identical to FIGURE 2 except these views show the cross-sectional shape of the wing after it has been flexed to different positions;

FIGURE 5 is an enlarged vertical cross-sectional view taken substantially on the plane of line 5—5 in FIGURE 2;

FIGURE 6 is an enlarged vertical cross-sectional view taken substantially on the plane of line 6—6 in FIGURE 2;

FIGURE 7 is an enlarged vertical cross-sectional view taken substantially on the plane of line 7—7 in FIGURE 2;

FIGURE 8 is an enlarged cross-sectional view taken substantially on the plane of line 8—8 in FIGURE 3;

FIGURE 9 is a partial cross-sectional view similar to FIGURE 2 but showing a modified operator for my variable shaped wing;

FIGURE 10 is a vertical cross-sectional view through a wing showing another modified form of my invention;

FIGURES 11 and 12 are views similar to FIGURE 10 but showing the parts in different operative positions;

Figure 1:
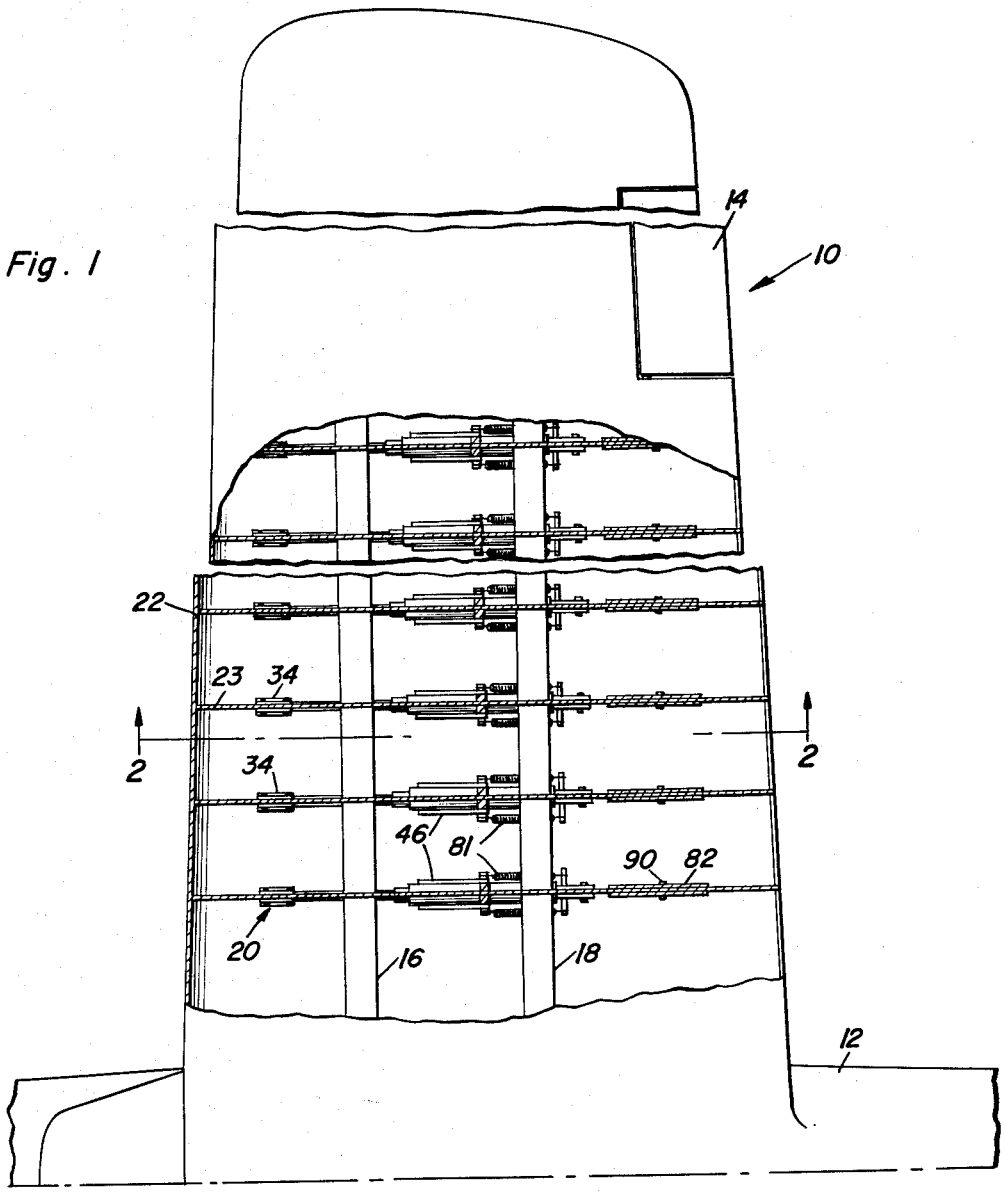
FIGURE 1 is a plan view of one form of my invention.

FIGURES 13 through 16, inclusive, are vertical cross-sectional enlarged views taken substantially on the planes of lines 13—13, 14—14, 15—15, and 16—16, respectively;

FIGURE 17 is a diagrammatic view showing a fluid control system for operating my flexible airfoil;

FIGURE 18 is a plan view illustrating a modified connecting structure between the flexible ribs and hydraulic operating motors of my variable shaped wing;

FIGURE 19 is an enlarged vertical cross-sectional view taken substantially on the plane of line 19—19 in FIGURE 18; and FIGURE 20 is an enlarged vertical cross-sectional view taken substantially on the plane of line 20—20 in FIGURE 18.

With continuing reference to the drawings wherein like reference numerals in the various views indicate identical parts, it can be seen that the form of my invention shown in FIGURES 1 through 8, comprises a flexible wing assembly 10 mounted on one side of a conventional airplane fuselage 12 and includes an aileron 14. The wing 10 is composed of a forward spar 16 and a rear spar 18 forming a rigid supporting frame and, a plurality of rib assemblies 20 connected to the spars, covered by a flexible skin 22 composed of conventional materials such as aluminum alloy to form an outer deformable airfoil surface. The ribs are floatingly connected to the spars by pivoted members, and the spars 16 and 18 extend into and are rigidly secured to the structural framework of the fuselage 12. The ribs 20 are rigidly connected by conventional means along their bottom edges to the bottoms of the spars 16 and 18, and the spars extend into and are rigidly secured to the framework of the fuselage 12.

Each rib assembly 20 includes a flexible resilient rib 23 of rectangular cross section and terminating in tapered ends which are separated from one another at the trailing edge 24 of the wing. As shown in FIGURE 2, the ribs 23 normally form a very streamlined airfoil which is substantially symmetrical about the horizontal centerline of the rib. The spars 16 and 18 are of I-shape in cross section, and the bottom flanges of the spars are rigidly secured to the bottom halves of the ribs 20 by conventional means such as welding. Adjacent the smooth but deformable leading edge 26 of the wing, each rib 23 is provided with upper and lower ears 28 and 30. The ears 28 and 30 in each rib are pivotally connected together by a pair of upper toggle links 32 and a pair of lower toggle links 34. The outer ends of the toggle links 32 and 34 are pivotally connected to the ears 28 and 30 by rivets or pivot pins 36 and 38 respectively while the adjacent ends of the toggle links overlap and are pivotally connected together by a pivot pin 40.

The center of each rib 23 is provided with an upper ear 42 and a lower ear 44 each connected to the end of a diagonal link 46 by means of pivot pins 48 and 50.

A flat operating horn 52 is connected to the bottom trailing edge of each rib 23 and lies in the plane thereof. Each horn 52 comprises a head 54 connected to a tapered body 56 by means of a neck 58. The rear end of the body 56 is triangular and its lower edge is welded to the trailing edge of the lower half of each rib. The upper edge of the triangular rear portion of the body 56 has a rectangular notch formed therein which receives an extension plate 60 secured to the horn.

The bottom edge of the head 54 is provided with a flange 62 which is slidably guided by grooves formed in guide plate 64 which are secured to the rib 23 on each side of the head. From the foregoing description of the flexible rib 23 and the linkage connections thereto, it will become apparent that while the rib may be deformed to change the airfoil contour, there is no pivotal or hinge axis fixed to the rigid supporting frame about which any portion of the rib is deformed so that no fixed pivotal relationship between the deformable airfoil surface and the rigid supporting frame exists that could not be altered in response to selective control and/or aerodynamic forces.

A conventional hydraulic motor 66 is coplanar with each of the ribs and connected between a head 54 and a set of the toggle links at the leading edge of each rib. The motor 66 comprises a conventional hydraulic cylinder 68 having a pair of rearwardly extending spaced ears 70 secured to the rear end thereof and overlapping the upper portion of the head 54. The ears 70 are pivotally connected to the head 54 by means of a conventional pivot pin 72. The cylinder 68 telescopically and slidingly receives a piston rod 74 which is connected to a conventional piston inside the cylinder. The forward end of the rod 74 is connected adjustably to an adapter 76 which extends between the toggle arms 32 and is pivotally connected thereto by means of the pin 40.

The forward and rear ends of the cylinder 68 are connected to a conventional control valve by means of a pair of fluid conduits 78 and 80. By means of these conduits and a control valve connected thereto, each end of the cylinder may be alternately connected to a source of fluid pressure or exhaust for reciprocating the rod 74 in either direction.

A coil spring 81 is connected under tension at each end to the ear 42 and the bottom of the head 54.

A pair of guide plates 82 of generally triangular configuration overlap and are secured to the upper rear portion of the rib 23. The lower inner surfaces of the guide plates are recessed and receive the body 56 or horn 52 therebetween. The body 56 has an elongated slot 84 formed therethrough which slidingly receives a roller 86 rotatably mounted on a pin 90 extending through and secured to the plates 82.

Referring particularly to FIGURES 2 and 5, it can be seen that the links 46 are spaced from one another so as to provide a space for the cylinder 68 to extend therebetween. The links are spaced from the rib 23 and cylinder 68 by means of tubular sleeves 92.

The spars 16 and 18 are provided with rectangular apertures 94 so that the ends of motor 68 may extend therethrough. The forward end of cylinder 68 is provided with a conventional seal 75 which slidingly receives the rod 74.

As shown in FIGURE 2, the wing 10 and each of the rib assemblies 20 are in a position of minimum thickness and the wing has a symmetrical streamlined cross section for permitting the aircraft 13 to fly at a high speed with a minimum of drag and a maximum of efficiency. The tension of coil spring 81 tends to maintain the wing in this configuration. If it is desired to increase the lift of the wing 10, the hydraulic line 80 is connected to a source of fluid pressure and the line 78 is connected to an exhaust conduit leading to a reservoir. This causes the piston rod to move forwardly and the cylinder 68 to move rearwardly. As the piston rod 74 moves forwardly, it operates the toggles 32 and 34 to an aligned position whereupon an abutment plate 96 which is connected across the bottom rear edges of the links 32 abuts against the upper rear surfaces 98 of the links 34 for preventing further relative pivotal movement between the links 32 and 34. The force of the cylinder 68 acting on the head 54 by means of ears 70 and pivot pin 72 causes the horn 52 to pivot downwardly about its connection with the guide plates 64. This is an intermediate expanded position of the wing as shown in FIGURE 3. It is to be noted that the forward thrust of the rod 74 has caused the upper half of the rib 23 to move forwardly which in turn pushes the leading edge 26 slightly forwardly as it flexes thereby actually increasing the size of the wing and exposing the extension plate 60 at the trailing edge of the wing for providing additional lift. It is also to be noted that the toggle links 34 are shorter than the toggle links 32 and the pivot points 36 are forward of the pivot points 38. This causes the upper forward portion of the wing to be pushed upwardly a greater distance and causes the toggle links to be canted upwardly and forwardly in their aligned position. As the upper portion of the rib 23 moves forwardly, the link 46 is rotated in a counterclockwise direction about pivot point 50 as viewed in FIGURE 3. As the link 46 moves to a position approaching the vertical, it expands the central portion of the wing. As the horn 52 pivots downwardly, rollers 86 roll in slots 84 and the rollers and guide plates 82 force the upper rear surface of the wing downwardly with the horns 52. The camber at 100 in conjunction with the expansion of the wing and the increased curvature of the wing at 102 greatly increases the lifting capacity thereof for any given speed.

FIGURE 4 shows the wing urged to its position of maximum thickness and maximum camber for producing the greatest lift possible. Of course it is to be realized that the pilot or any crew member may by remote control means urge the wing to any position between the FIGURE 2 and FIGURE 4 configuration and maintain the wing in this position merely by locking the fluid by means of a control valve within cylinder 68. Also, by connecting the conduits 78 and 80 to an accumulator, the piston rod 74 and its piston connected thereto within the cylinder 68 may move within the cylinder against the resilient compression of the fluid in the cylinder by the accumulator to thereby function as shock absorbing means for the wing and at the same time to permit it to flex and give in or react to turbulent air tending to change the airfoil shape to an optimum contour for the atmospheric conditions prevailing at that instant.

Also, it is to be noted that the single motor 66 in this form of my invention as well as in my other forms may be substituted for two separate motors, each of which is connected to either the toggle links 32 and 34 or the horn 52.

FIGURE 9 illustrates a modified form of power operator for my flexible ribs. Threaded rods 73 and 69 are substituted for piston rods 74 and ears 70, but are connected to toggle links 32 and 34 and horn 52 in the same manner. The threads on the rods 73 and 69 are of an opposite pitch and mate with the internal threads of an elongated sleeve 102. The central portion of sleeve 102 is integrally connected to a sprocket 104. All of the sprockets 104 may be operated by a single chain 106 which is drivingly connected to a driving sprocket on a power source, not shown. When sprocket 104 is rotated in opposite directions, it will expand or contract the rib 23 in the same manner as hydraulic motor 66.

The modified form of my wing 10' shown in FIGURES 10 through 16 is similar in many respects to the wing 10 shown in FIGURES 2 through 8. The primary difference between the two species, is that in the species shown in FIGURE 2, the wing structure is secured to the wing spars 16 and 18 and the hydraulic actuating motor 66 is floatingly connected to the operating linkages of the wing, while in the species shown in FIGURE 10, the wing 10' is floatingly mounted in relation to the wing spars 16' and 18' while the motor 66' is secured to the spars.

The wing 10' also comprises a plurality of spaced flexible ribs 23' split at their trailing edges as shown at 104 and having a symmetrical streamlined shape. The upper and lower forward portions of each rib 23' are pivotally connected together by toggle links 32' and 34' which are pivotally connected at their adjacent ends by a pivot pin 40 and are connected at their free ends pivotally to the rib 23' by pivot pins 36 and 38. The pivot pins 36 and 38 extend through ears 28' and 30' on the rib. Upper and lower ears 42' and 44' are connected together by a sloping link 46 pivotally connected to the ears by pivot pins 48 and 50.

A horn 52' of generally triangular configuration is pivotally connected at its bottom forward corner to an ear 106 on the rib by means of a pivot pin 108. The horn extends rearwardly and converges to a point. The tapered rear end of the horn 52' is rigidly secured to the lower trailing edge of the rib and the extension plate 60. The horn has an elongated slot 84' formed therein which receives a roller or roller bearing 110 rotatably mounted on a pivot pin or rivet 112 as more clearly seen in FIGURE 15. The rivet 112 extends between and is secured to guide plates 82' which overlap opposite sides of the horn 52' and are secured to the upper trailing edge portion of rib 23'.

An hydraulic motor 66' including a cylinder 68' extends through aligned bores in the spars 16' and 18' and is rigidly secured to the spars by means of flanges 115. Two opposing pistons 114 and 116 are slidably mounted within the cylinder 68' and are connected to piston rods 74' and 70' which extend through seals 75' in the ends of the cylinder. The rod 74' is connected to a fitting 76' which is pivotally connected by means of pin 40 to the toggle links 32' and 34'. The piston rod 70' is connected to a yoke 118 which receives the upper forward corner of horn 52' and is pivotally connected thereto by a pin 120 which extends through the yoke in a vertical slot in the horn.

The central portion of the cylinder 68' is connected to a pressure line 122 and the ends of the cylinder are connected to pressure lines 124 and 126.

The wing is urged to a centered position in relation to the spars 16' and 18' by means of coil springs 128 and 130 which are tensioned between the spars and the bottom portion of the rib 23'. The spars 16' and 18' are rigidly secured to the framework of the fuselage of the aircraft. Separate hydraulic motors could also be connected generally parallel to the springs 128 and 130 between the rib and spars whereby the pilot or crew could by remote control means activate these motors to move the wing forward or backward in relation to the spars 16' and 18' and the fuselage of the aircraft for moving the wings and the center of lift thereof to favorably correspond with the location of the center of gravity of the aircraft.

FIGURE 17 shows a fluid control system for the form of my wing shown in FIGURES 10 through 16. The wing control motor 66' is provided with three chambers or spaces, namely, a central chamber 132 between the pistons 114 and 116, a forward chamber 134 between the forward end of the cylinder and the piston 116, and a rear chamber 136 to the rear or rear piston 114. The chambers 134, 132 and 136 are connected to a pilot's control valve assembly 138 by means of conduits 124, 122 and 126 respectively. The control valve assembly 138 is in turn connected to a reservoir 140 containing hydraulic fluid 142 by means of an exhaust conduit 144, a pressure supply line 146, pump 148 and intake line 150. The pressure supply line and pump are connected to pressure vent valves controlled by valve plungers 152 which exhaust back into the reservoir 140 by means of a line or conduit 154 when pressure in supply line 146 exceeds a predetermined value governed by relief valve 152'. The valve assembly 138 therefore includes two internal regulating valves with which the plungers 152 are associated for controlling the thickness of the wing 10' to control the forward and rearward movement of the wing 10'. The plungers 152 are slidably mounted in the valve block or housing and pivotally connected at 156 and 166 to control handles 158 and 164 respectively pivotally mounted at 160 and 168 to the valve housing 162. In this manner, aerodynamic forces may be changed by the pilot. The valve regulating handle 158 may be operated to a first position to supply fluid pressure from line 146 to line 122 thereby urging pistons 114 and 116 apart for expanding the wing 10'. While the wing is expanding, the lines 124 and 126 are both connected to the exhaust conduit 144. For contracting the wings, the plunger 152 is operated to a position to connect pressure line 146 to lines 124 and 126 while connecting line 122 to exhaust conduit 144. This causes the pistons 114 and 116 to be urged together thereby contracting the wing. The valve plunger 152 may also be urged to a fully closed position for sealing off the lines 124, 122 and 126 for locking the wing in any set position. Also, the valve plunger 152 may be moved to a regulating position where it connects or partially connects through a restricted opening, the lines 124 and 126 so that as the pistons 114 and 116 move together with respect to the cylinder under pilot varied resistance to aerodynamic forces, the fluid being forced through lines 124 and 126 and the restricted valve opening to act as a shock absorber or vibration dampener to permit the wing to move with respect to its spars for absorbing shock when responding to aerodynamic influences.

The valve plunger associated with valve handle 164 is normally in an inoperative position, but may be moved to two separate operative positions for changing the location of aerodynamic forces under pilot control. In the first operative position, line 126 is connected to pressure line 146 and line 124 is connected to exhaust conduit 144 whereby fluid pressure is admitted to chamber 136 for urging the entire wing assembly forwardly with respect to its spars 16' and 18'. In a second operative position, line 124 is connected to pressure line 146 and line 126 is connected to exhaust conduit 144 whereby fluid pressure is admitted to chamber 134 for urging the wing assembly rearwardly. In both operative positions, the conduit 122 is closed whereby the fluid in chamber 132 acts as a solid piston. Intake line 150 is provided with a conventional filter 170. The control valves associated with the valve handles 158 and 164 comprising control valve assembly 138 are of conventional construction and constitute no part of this invention.

Again referring to FIGURES 10-12 in conjunction with FIGURE 17, when control valve handle 158 is operated to supply fluid pressure to central chamber 132, piston rods 70' and 74' are urged apart. Piston rod 74' moves toggle links 32' and 34' to the aligned position illustrated in FIGURE 11 whereupon abutment plate 96 contacts abutment surfaces 98 for preventing further pivotal movement between the toggle links. When the toggle links straighten, or move to an aligned position, the leading edge portion 26' of the wing is considerably expanded in thickness. It is to be noted that pivot point 36 is ahead of pivot point 38 and toggle links 32' are longer than toggle links 34'. As toggle links 32' and 34' move to an aligned position, piston rod 70' pivots horn 52' in a clockwise direction as viewed in FIGURES 10 and 11 about pivot point 108 thereby deflecting the trailing edge of the wing downwardly to form a camber or concave chamber 100' in the rear portion of the wing. As toggle links 32' and 34' move forwardly, diagonal link 46 pivots counter clockwise or forwardly about pivot point 50 to a more vertical position thereby expanding the central portion of the wing. The upper surface or skin 22 of the wing moves forwardly with links 32' and 46 as shown by the arrow in FIGURE 11 thereby providing a space at the trailing edge of the wing which uncovers extension plate 60. This obviously increases the chord and the total area of the wing for further increasing its lift. As the pistons 114 and 116 are further urged apart towards the maximum expanded condition shown in FIGURE 12, the bottom portion of the rib is placed under tension since an equal stress is imposed upon the ears 30' and 106. However, since these ears are connected together by the bottom of the rib, they cannot move apart. While the bottom of the rib remains substantially non-movable, the upper portion of the rib is urged forwardly by rod 74' and link 32' and thus causes the diagonal link 46 to move to an almost vertical position further expanding the central portion of the wing while the roller 110 rolls in cam slot 84' to expose additional areas of extension plate 60. Also, the forward movement of rod 74' bends the forward lower portion of rib 23' downwardly to form an additional camber or concave area 101'. As the bottom edge of the rib bends to form a concave configuration, the central portion thereof moves upwardly to contact the bottom surfaces of spars 16' and 18' as shown in FIGURE 12.

It can thus be seen that when the wing is moved to the FIGURE 12 position, three changes have taken place to improve its lifting characteristics. Firstly, its thickness and upper curvature has been increased for forming a higher vacuum on the upper rear surface of the wing, secondly, the area of the wing has been increased due to the forward movement of the upper surface of the wing thereby exposing extension plate 60, and thirdly, the concave or cambered areas 101' and 100' further function to improve the lifting characteristics of the wing.

The ribs 23' and the operating components thereof may be arranged as illustrated in FIGURE 1.

FIGURES 18 and 19 illustrate another form of my invention which is substantially the same as that form shown in FIGURES 10-16, the primary difference being in the arrangement of the hydraulic operating motors. The rib structure shown in FIGURE 19 includes a plurality of ribs 23" having operating mechanism substantially identical to the operating mechanism illustrated in FIGURES 10-16. This mechanism includes toggle links 32" and 34" connected together and to the rib 23" in the same manner as the toggle links 32' and 34'. It also includes a diagonal link 46 and hydraulic motor 66" connected to the rib and spars in the same manner as explained above.

Instead of there being a hydraulic motor for each rib, only two hydraulic motors are provided for the entire wing 10". The forward piston rods 74" are connected to a forward beam 171 by means of U-shaped bolt assemblies 170. The rear piston rods 70" are connected to a rear operating beam 174 by means of the same U-shaped nut and bolt assemblies 170. A plurality of forwardly projecting arms 176 in vertical alignment with the ribs 23" are connected to the forward beam 171 by a plurality of U-bolt assemblies 170 as more clearly seen in FIGURE 20. The forward ends of these arms are each connected to one of the pivot pins 40 pivotally connecting the toggle links. In a like manner, the rear operating beam 174 is connected to a plurality of rearwardly extending arms 178 by means of U-bolt assemblies. These arms 178 are pivotally connected at 180 to L-shaped horns 182 which are fixed at 184 and 186 to the bottom portion of the rib 23" as seen in FIGURE 19. The horn 182 is slidably guided by a sleeve 188 fixed to the upper rear portion of rib 23". A plurality of stringers 190 extend parallel to the main spars and connect the ribs together.

The spars 16" and 18" are rigidly connected at their outer ends to a wing tip portion 191 of conventional construction and which has a conventional aileron 192 at its trailing edge. The skin 22' covering the central flexible portion of the wing terminates in straight end edges 194 and 196 which are slightly spaced from airfoil shaped fences 198 and 200 fixed to the wing tip and fuselage of the aircraft respectively.

In operation, the piston rods 74" and 70" operate the beams 171 and 174 which in turn operate the toggle links and horns by means of the arms 176 and 178. The wing 10" operates in substantially the same manner as the wing 10' previously described above.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An airfoil assembly for aircraft comprising, a rigid supporting frame, a deformable rib forming a continuous and variable airfoil contour enclosing said rigid supporting frame having leading and trailing edge portions displaceable relative to the frame in chordal relation thereto, said rib including relatively movable ends which form said trailing edge portion, elastically biased linkage means operatively connected to the rib for variably resisting deformation of the rib from a selected airfoil contour, yieldable operating means mounted by the frame and operatively connected to the linkage means for preselecting the selected airfoil contour by changing the curvature of the leading edge portion, said operating means including means for regulating the variable resistance to deformation of the rib from said selected airfoil contour, and means operatively connected to the rib intermediate the leading and trailing edge portions for effecting relative movement between said ends of the rib in response to deformation thereof from one of the selected airfoil contours.

2. The combination of claim 1 wherein said yieldable operating means comprises a fluid cylinder device, piston means slidably movable within said cylinder device, control valve means operatively connected to said cylinder device for effecting movement of the piston means relative to the cylinder device to vary the airfoil contour, said regulating means being operative on the cylinder device to selectively vary resistance to extension and retraction of the piston means relative to the cylinder device by forces imposed on the rib.

3. In combination with an airfoil assembly having an airfoil contour rib deformable throughout, contour controlling means comprising; linkage means operatively connected to said rib, biasing means operatively connected to the rib and cooperating with the linkage means for maintaining an optimum airfoil contour under normal ambient atmospheric conditions, yieldable operating means operatively connected to the linkage means for selectively changing the airfoil contour against the bias of said biasing means to produce a change in location and magnitude of aerodynamic forces imposed on the rib, said yieldable operating means including means for regulating resistance to change in the airfoil contour in response to variations in said aerodynamic forces imposed on the rib during changes in ambient atmospheric conditions.

4. The combination of claim 3 wherein said yieldable operating means comprises a fluid cylinder device, piston means slidably movable within said cylinder device, control valve means operatively connected to said cylinder device for effecting movement of the piston means relative to the cylinder device to vary the airfoil contour, said regulating means being operative on the cylinder device to selectively vary resistance to extension and retraction of the piston means relative to the cylinder device.

5. In an airfoil assembly for aircraft or the like, a rigid supporting frame, a continuous, deformable rib forming a variable airfoil contour having leading and trailing edge portions interconnected by upper and lower intermediate portions, power operated means mounted by said frame and enclosed within the airfoil contour formed by the rib, linkage means interconnected with the upper and lower portions of the rib in spaced adjacency to the leading edge portion, means connecting said linkage means to the power operated means for changing the normal curvature of the leading edge portion, biasing means cooperating with said linkage means for yieldably resisting deformation of the rib from an airfoil contour predetermined by the curvature of said leading edge portion, link means interconnected with the upper and lower intermediate portions of the rib independently of the power operated means and the frame for varying the position of the leading edge portion relative to the frame in response to actuation of the power operated means following said change in the curvature of the leading edge portion, said power operated means including means for regulating resistance thereof to movement by the linkage means in response to external forces imposed on the rib.

References Cited by the Examiner

UNITED STATES PATENTS

| 1,225,711 | 5/17 | Holle | 244—44 |
| 1,755,886 | 4/30 | McKenzie | 244—44 |
| 1,846,146 | 2/32 | Rocheville | 244—44 |
| 2,258,490 | 10/41 | Gutridge | 244—44 |
| 2,288,750 | 7/42 | Seeman | 244—44 |
| 2,364,006 | 11/44 | Smith | 244—44 |
| 2,372,447 | 3/45 | Peters | 244—44 |
| 2,650,047 | 8/53 | Carhart et al. | 244—44 |
| 2,753,134 | 7/56 | Gordon et al. | 244—85 |
| 3,127,130 | 3/64 | Lyon | 244—44 |

FOREIGN PATENTS

| 103,400 | 1/17 | Great Britain. |
| 575,402 | 4/24 | France. |

FERGUS S. MIDDLETON, *Primary Examiner.*

MILTON BUCHLER, *Examiner.*